United States Patent [19]

Hall et al.

[11] 3,839,097

[45] Oct. 1, 1974

[54] STABILIZATION OF ACIDIC AQUEOUS COATING COMPOSITIONS CONTAINING AN ORGANIC COATING-FORMING MATERIAL

[75] Inventors: Wilbur S. Hall, Plymouth Meeting; Harry M. Leister, Ambler, both of Pa.

[73] Assignee: Amchem Products, Inc., Ambler, Pa.

[22] Filed: Nov. 20, 1972

[21] Appl. No.: 308,176

Related U.S. Application Data

[63] Continuation-in-part of Ser. No. 257,107, May 26, 1972, abandoned.

[52] U.S. Cl. ............... 148/6.2, 117/113, 117/132 C
[51] Int. Cl. .......................... C23f 7/00, B44d 1/098
[58] Field of Search...... 117/132 C, 113; 148/6.153, 148/6.15 R, 6.27, 6.2

[56] References Cited
UNITED STATES PATENTS

| | | | |
|---|---|---|---|
| 3,420,715 | 1/1969 | Ayres | 148/6.16 |
| 3,514,343 | 5/1970 | Bauman | 148/6.2 |
| 3,585,084 | 6/1971 | Steinbrecher et al. | 148/6.2 |
| 3,592,699 | 7/1971 | Steinbrecher et al. | 148/6.2 |
| 3,647,567 | 3/1972 | Schweri | 148/6.15 R |
| 3,709,743 | 1/1973 | Dalton et al. | 148/6.2 |

FOREIGN PATENTS OR APPLICATIONS

| | | | |
|---|---|---|---|
| 1,099,461 | 1/1968 | Great Britain | 148/6.2 |

OTHER PUBLICATIONS

Engineers Handbook, Hesler, "Recovery and Treatment," 7 pps. (1961).

*Primary Examiner*—William D. Martin
*Assistant Examiner*—Harry J. Gwinnell
*Attorney, Agent, or Firm*—Synnestvedt & Lechner

[57] ABSTRACT

An acidic aqueous coating composition containing an organic coating-forming material forms on a metallic surface immersed therein a coating, the weight or thickness of which is related to the time the surface is immersed in the composition. The coating composition, which tends to become unstable as a result of the build up of metal ions in the composition, is stabilized by removing the metal ions with an ion exchange material. Also, in maintaining stability, anionic and/or nonionic surfactants or dispersing agents, which are present in the composition to disperse the organic-coating forming material, are added to the composition in an amount in excess of that which is added to replenish the organic coating-forming material as it is consumed during use. Also, coating compositions treated with the ion exchange material tend to produce coatings which have a textured or grainy appearance. The texturing of coatings can be avoided by contacting the coating composition with the ion exchange material in the presence of a cationic surfactant or an amphoteric surfactant which has cationic properties in the acidic aqueous coating composition, or other material which maintains the relatively small particles of the organic coating-forming material in the composition.

45 Claims, No Drawings

STABILIZATION OF ACIDIC AQUEOUS COATING COMPOSITIONS CONTAINING AN ORGANIC COATING-FORMING MATERIAL

CROSS-REFERENCE TO RELATED APPLICATION

This is a continuation-in-part of U.S. application Ser. No. 257,107, filed May 26, 1972, now abandoned.

FIELD OF THE INVENTION

This invention relates to the application of coatings to metallic surfaces. More specifically, this invention relates to a method for maintaining the stability of a coating composition which is used to coat metallic surfaces by immersing them in the composition.

The coating composition to which this invention relates is an acidic aqueous composition containing an organic coating-forming material which is capable of forming on a metallic surface immersed therein a coating, the thickness or weight of which is related to the time the surface is immersed in the composition. The properties of the coating are determined chiefly by the type of organic coating-forming material used in the composition. For example, a composition containing a resin such as styrene-butadiene copolymer is capable of forming coatings with good protective properties as evidenced by their ability to protect the metal substrate from corrosion. On the other hand, coatings having good lubricating properties can be formed from a composition which contains an organic coating-forming lubricant such as, for example, fatty oils, fatty acids, waxes and mineral oils.

An example of a coating composition of the type to which this invention relates and which forms a coating having good corrosion resistance is one which comprises resin solids dispersed in an acidic aqueous solution containing hydrogen peroxide and hydrofluoric acid. Coating compositions of this type perform substantially differently, and thus, are to be distinguished from, a conventional latex, that is a dispersion of insoluble resin particles in water. Although a conventional latex can be utilized to form a resinous coating on a metallic surface by immersing the surface in the latex, the thickness or weight of the resulting coating is substantially the same regardless of how long the surface is immersed therein. On the other hand, the acidic aqueous coating composition to which this invention relates deposits coatings on the metallic surface, the thickness or weight of which is governed by the time the surface is immersed in the composition. The longer the time of immersion, the greater the thickness or weight of the coating.

However, a problem that has been encountered in the use of the acidic aqueous coating compositions to which this invention relates is that as the composition is used to coat quantities of metallic surfaces, the composition eventually becomes unstable. A destabilized composition is characterized by flocculation, coagulation or gelling of the organic coating-forming material. After the composition becomes unstable, it can no longer be used effectively to coat metallic surfaces. For all practical purposes, the composition is rendered inoperative.

Abortive attempts were made to preserve the stability of the bath of coating composition by replenishing the ingredients comprising the composition as they were depleted during use of the composition. However, it was found that replenishment of the makeup ingredients alone was not sufficient to maintain the stability of the composition. By way of example, it is noted that a replenished coating composition became unstable notwithstanding that the amounts of ingredients in the composition were about the same immediately prior to its becoming unstable as when the composition was being used to effectively form coatings on metallic surfaces immersed therein.

This invention is directed to maintaining the stability of a bath of an acidic aqueous coating composition containing an organic coating-forming material of the type which forms on a metallic surface immersed therein a coating, the weight or thickness of which is a function of the time the surface is immersed in the composition.

BRIEF DESCRIPTION OF THE INVENTION

In accordance with this invention it has been found that the stability of acidic aqueous coating compositions of the type referred to above can be maintained by treating the coating composition with an ion exchange material which removes from the composition metallic ions which otherwise cause the composition to become unstable.

By way of brief explanation, it is noted that when a metallic substrate is immersed in the coating composition to which this invention relates, the composition attacks the metal surface and metal ions are dissolved therefrom. The metal ions cause the organic coating-forming material to deposit on the metallic surface by rendering the material unstable in the region of the metallic surface. As a bath of the coating composition is used to coat quantities of metallic surfaces, additional amounts of metal ions enter the composition and the concentration thereof increases. Eventually, the concentration of the metal ions increases to the extent that the coating composition becomes unstable, that is, the organic coating-forming material tends to flocculate, coagulate or gel throughout the whole of the coating bath and not just in the region of the metallic surface. In essence, the coating composition is rendered inoperative. In accordance with this invention, the coating composition is treated with an ion exchange material to extract therefrom the metal ions which cause the composition to become unstable. Such metal ions are referred to herein as "excess metal ions." It should be understood that as quantities of metal are coated in a bath of the coating composition, additional metal ions, which are dissolved from the metal surface, continue to render the coating-forming material unstable in the region of the metallic surface, and that treatment of the coating composition with an ion exchange material in accordance with this invention does not interfere with this process by which the coating is formed on the metallic substrate. In effect, the invention provides a method for maintaining the coating-forming material in the composition stable except in the region of or adjacent to the metallic surface.

Other aspects of this invention include: the use of particular types of ion exchange materials to provide important operating advantages; treatment of the ion exchange material to remove therefrom extraneous materials which tend to contaminate the coating composition; regeneration of the ion exchange material with materials that tie-up metal ions displaced from the ion exchange material during regeneration thereof; and contacting said coating composition with a stoichiometric excess of ion exchange material.

For maintaining stability of the coating composition, the present invention includes also within its scope the addition to the composition of dispersing agent or surfactant for the organic coating-forming material to keep the surface tension of the aqueous coating composition from rising to a level at which the composition tends to become unstable. The amount of dispersing agent (anionic or nonionic) added is an amount over and above that which might be added to the composition when replenishing the organic coating-forming material as it is consumed during use. By adding "extra" dispersing agent for the organic coating-forming material to the coating composition and subjecting the composition to the ion exchange material, as described briefly above, the coating composition can be maintained stable for an indefinite period during use thereof.

In certain applications, it may be found that after the coating composition is treated with an ion exchange material, the composition will begin to form coatings that have a grainy or textured surface. For some types of articles, this grainy or textured surface may be very desirable and aesthetically appealing. On the other hand, the appearance of such a grainy or textured coating surface may be considered to be aesthetically unappealing and/or functionally disadvantageous.

Another aspect of this invention relates to avoiding or reducing the graininess or texturing of coatings which are produced from a coating composition of the aforementioned type after it is treated with an ion exchange material to remove therefrom metal ions which tend to destabilize the composition.

In accordance with this invention, a preferred method for reducing the degree of or avoiding such graininess or texturing of coatings is to incorporate into the coating composition before it is treated with the ion exchange material a surfactant which exhibits cationic properties in the acidic aqueous coating composition. A cationic surfactant or an amphoteric surfactant which exhibits cationic properties in the acidic coating composition can be used. Preferably an amphoteric surfactant is used. Coating compositions containing such a surfactant are capable of producing coatings having a reduced degree of texture or of producing smooth coatings, that is, coatings which are not grainy or textured in appearance, when they are used to coat metallic surfaces after they have been treated with an ion exchange material.

It is noted that surfactants having cationic properties are generally considered to be corrosion inhibitors. Surprisingly, it has been found that the presence of the aforementioned type of surfactant does not necessarily inhibit coating formation notwithstanding that the coating composition to which this invention relates functions by dissolving metal ions from the metallic surface contacted therewith. Furthermore, it has been found that the presence of said surfactant in the coating composition does not appear to change adversely the other physical or chemical properties of the coatings.

It is believed that as the coating composition is treated with the ion exchange material, the smaller coating-forming particles which comprise the organic coating-forming material dispersed in the coating composition tend to be lost, for example, by coalescing into larger particles, or being absorbed by larger particles, or being adsorbed by the ion exchange material. It is believed that the grainy or textured coatings are formed as a result of a reduced in content or absence of the aforementioned smaller particles which originally are contained in the coating composition, along with larger particles, the latter having a size, for example, of about 0.2 to about 0.5 micron. The smaller particles can range in size from about 0.01 to about 0.1 micron. In accordance with this invention, there is added to the coating composition a material which functions to maintain the smaller particles of organic coating-forming material in the composition when it is treated with an ion exchange material. As mentioned above, surfactants having cationic properties in the acidic aqueous coating composition can be used to accomplish this, and preferably an amphoteric surfactant having such properties. However, other materials which function to keep the smaller particles dispersed in the coating composition can be used also. Examples of such materials include protective colloids.

As will be explained more fully below, dispersing agent for the smaller particles of the coating-forming material can be included in the ion exchange material. When it is contacted with the coating composition, said dispersing agent is effective in maintaining the smaller particles of organic coating-forming material in the composition.

Another aspect of the invention, discussed in detail below, is the use of a stoichiometric excess of the ion exchange material.

DETAILED DESCRIPTION OF THE INVENTION

It should be appreciated from the above discussion that the coating compositions to which this invention relates are those acidic aqueous coating compositions containing an organic coating-forming material which compositions dissolve metal ions from a metallic surface immersed therein and which form on said surface a coating, the weight or thickness of which increases during at least a portion of the time that the metallic surface is immersed in the composition.

It is believed that the present invention will be used most widely with the coating compositions of the type described in U.S. Pat. Nos. 3,585,084 and 3,592,699 to Hall and Steinbrecher, assigned to the same assignee as the present invention. Speaking generally, the coating compositions disclosed in the aforementioned patents comprise water, an organic coating-forming material, an oxidizing agent, and hydrogen ion in an amount sufficient to impart to the composition a pH below 7. Examples of organic coating-forming materials, which can be present in the acidic aqueous composition in dissolved, emulsified or dispersed form, depending on the nature of the material, include ethylene-maleic anhydride copolymer, polyethylene, polyacrylics, styrene-butadiene copolymer, polyacrylic acids and polytetrafluoroethylene. Examples of oxidizing agents that can be used in the coating composition are hydrogen peroxide, dichromate, perborate, bromate, permanganate, nitrite, nitrate and chlorate. Examples of acids that can be used in the composition are sulphuric, hydrochloric, hydrofluoric, nitric, phosphoric, hydrobromic, hydroiodic, acetic, chloracetic, trichloracetic, lactic, tartaric, polyacrylic, fluoboric, fluotitanic, and fluosilicic. It is noted that an acid which contains an anion that functions as an oxidizing agent can be the source of not only the hydrogen ion, but also the oxidizing agent. An example of such an acid is nitric acid.

The amount of coating-forming material utilized in the acidic aqueous composition can vary over a wide range. The lower concentration limit is dictated by the amount of coating material needed to provide sufficient material to form a coating. The upper limit is dictated by the amount of material which can be incorporated in the acidic aqueous composition. The acid ingredient is used in an amount sufficient to impart a pH of less than 7 to the composition, and preferably a pH of about 1.6 to about 3.8. The amount of oxidizing agent that should be used is an amount sufficient to provide an oxidizing equivalent of at least about 0.01 per liter of the composition. (The term "oxidizing equivalent" when used herein means the number of grams of oxidizing agent used divided by the equivalent weight of the oxidizing agent. The equivalent weight of the oxidizing agent is the gram molecular weight of the agent divided by the change in valence of all atoms in the molecular which change valence (usually one element).) Amounts of oxidizing agent which provide an oxidizing equivalent somewhat below 0.01 can be used, but preferably the oxidizing equivalent should be at least within the range of about 0.01. It appears that there is no critical upper limit as to the oxidizing equivalents that are used; however, it is preferred that the oxidizing agent be present in an amount such that the upper oxidizing equivalent value is about 0.2. However, it should be understood that the oxidizing agent can be used in an amount to provide an oxidizing equivalent much higher than 0.2, for example, one or more.

Preferred resinous coating compositions described in the aforementioned patents comprise:

a. about 5 g/l to about 550 g/l of resin dispersed in the composition, the source of the resin being a latex thereof;

b. about 0.4 g/l to about 5 g/l of fluoride ion;

c. an oxidizing agent selected from the class consisting of $H_2O_2$ and dichromate, said agent being present in an amount sufficient to provide from about 0.01 to about 0.2 of oxidizing equivalent per liter of composition; and d. hydrogen ion in an amount sufficient to impart a pH to the composition of about 1.6 to about 3.8.

With respect to the resin component of the above described preferred composition, it is present in the composition in the form of dispersed particles. This aqueous resin dispersion is preferably supplied as a latex. The concentration of the resin in the composition has an influence on the weight of coating that will be obtained, other factors held constant. Compositions with greater amounts of a particular resin will produce higher coating weights.

As set forth above, the preferred aqueous acidic coating composition contains fluoride ion. The optimum, preferred method of making the composition acidic and adding fluoride ion comprises the use of hydrofluoric acid. This acid permits a simple means for control over pH requirements of the composition and obviates the need for introducing the fluoride ion in the form of an alkali metal, ammonium or other salt. While coatings can be obtained by adding the fluoride in salt form, it is preferred to utilize hydrofluoric acid and avoid the use of salts which may give rise to undesirable cations in the coating composition or complicate pH adjustment. If the fluoride component is added in the form of a salt, the pH of the composition can be adjusted by the use of acids other than hydrofluoric or in combination with hydrofluoric. Examples of such acids include sulfuric, phosphoric, nitric and hydrochloric.

As noted hereinabove, the preferred pH value of the acidic aqueous resin coating composition is within the range of about 1.6 to about 3.8. If the pH is permitted to fall below about 1.6, the coating composition may tend to etch the metal surface. On the other hand, if the pH of the coating composition exceeds about 3.8, the composition tends to impart very thin coatings to the metal substrate.

The oxidizing agent used in the preferred coating composition is hydrogen peroxide or dichromate ion ($Cr_2O_7$). Hydrogen peroxide is most preferred. The hydrogen peroxide can be added conveniently in the form of a 30 percent aqueous solution of hydrogen peroxide. The dichromate constituent can be added in the form of a variety of water soluble hexavalent chromium-containing compounds. Examples of such compounds include chromic acid, potassium dichromate, magnesium dichromate, potassium chromate and sodium chromate. Any water soluble hexavalent chromium-containing compound, which in an aqueous acidic medium forms dichromate, can be used. Preferred sources of the dichromate ingredient are dichromates, for example calcium dichromate. Particularly good results have been obtained by utilizing an aqueous solution of chromic acid and a calcium salt, for example calcium carbonate. In addition, particularly good results have been obtained by adding to the composition an aqueous solution made up from potassium dichromate and calcium acetate. It is preferred also that the source of dichromate be added to the latex used in the form of an aqueous solution of the hexavalent chromium-containing compound.

The preferred amount of oxidizing agent is an amount sufficient to provide an oxidizing equivalent of about 0.01 to about 0.2 in one liter of the composition. Somewhat lesser amounts of the oxidizing agent which provide an oxidizing equivalent outside of the lower value can be utilized also. The upper equivalent value is not critical and can be much higher. For example, resinous coatings have been obtained when the amount of hydrogen peroxide used provided an oxidizing equivalent in excess of one. It has been observed that when dichromate is utilized as the oxidizing agent in amounts to provide oxidizing equivalents in the higher range, then higher amounts of fluoride should be used — for example 3½ to 5 g, when the dichromate equivalent is within the range of about 0.1 to about 0.2.

As to particularly preferred amounts of the oxidizing agent, there should be utilized about 0.3 to about 3.0 g/l of hydrogen peroxide (approximately 0.02 to 0.2 equivalent) and from about 1 g/l to about 2 g/l of dichromate (approximately 0.03 to 0.055 equivalent). However, when an aqueous solution made up from chromic acid and calcium carbonate or when an aqueous soluton made up from potassium dichromate and calcium acetate is used, then lower amounts of dichromate can be utilized and thicker coatings can be obtained, for example about 0.735 g/l to about 0.95 g/l of dichromate (approximately 0.02 to 0.03 equivalent).

The above described compositions can be utilized to good advantage to produce quality coatings, the thickness of which can be controlled by the time a metallic surface is immersed therein. Also, coatings produced from such compositions are initially adherent to the metal surface and resist being removed therefrom when the coated surface is rinsed after it is withdrawn from the composition. Coatings with good corrosion resistance and adhesion properties can be produced.

An additional coating composition that can be used in the practice of the present invention comprises an acidic aqueous solution containing the aforementioned type of organic coating-forming material, ferric ion, and optionally, an oxidizing agent of the aforementioned type. The ferric ion can be incorporated in the composition by adding thereto iron compounds which will yield or liberate ferric ion in the composition, such as iron compounds which are soluble in the composition. Examples of such materials include ferric fluoride, ferric nitrate, ferric chloride, ferric phosphate and ferric oxide. The composition can be acidified by adding thereto the aforementioned type of acids. The acidic aqueous composition preferably has a pH of about 1.6 to about 5.0 and can comprise about 5 to about 550 g/l of resin, about 0.025 g/l to about 3.5 g/l of ferric ion (preferably about 0.3 g/l to about 1.6 g/l), and optionally about 0.01 to about 0.2 oxidizing equivalent per liter of oxidizing agent. Preferred compositions of this type include: about 5 to about 550 g/l of resin solids added in the form of an anionically stabilized resin dispersion, about 1 to about 5 g/l of ferric fluoride trihydrate and an acid in an amount sufficient to impart a pH of about 1.6 to about 5.0 to the composition. Preferably, hydrofluoric acid is used and in an amount such that the composition contains about 0.4 to about 5 g/l of fluoride ion. Such coating compositions are also capable of forming on metallic surfaces coatings, the weights or thicknesses of which are increased, the longer the metallic surfaces are immersed in the composition. After the coated surface is withdrawn from the coating composition it should be exposed to an oxidative environment, such as by allowing the surface to stand in air for a time of about 15 seconds to about 10 minutes. Thereafter, the coating can be rinsed and dried thereby providing a tightly adherent and uniform coating on the metallic surface. It is noted that the time of exposure of the coating (after the metallic surface is withdrawn from the coating composition) to the oxidative environment should not be so long as to allow the coating to dry before it is rinsed.

Other optional ingredients can be added to the coating compositions. The addition of a coalescing agent, for example, ethylene glycol monobutyl ether, can enhance the corrosion resistant properites of the coatings. Preferred amounts of the coalescing agents are about 5 to about 30 grams per liter of the composition. As an aid in assuring thorough wetting of the metallic surface during treatment, it is sometimes preferable to incorporate into the coating composition a small quantity of a wetting agent, such as up to about 0.15 percent by weight of the total composition, over and above that which may be present in the source of the coating-forming material, for example, a latex. Pigments can be incorporated into the composition to give coatings of the desired colors and to provide decorative or aesthetic effects.

The coating composition for use in the practice of this invention can be utilized to coat a variety of metallic surfaces. Particularly good results have been obtained in the coating of ferriferous and zinciferous surfaces. Examples of other metallic surfaces that can be coated are aluminum, copper, tin, and lead.

Metallic surfaces which have thereon a previously formed coating also can be coated by the coating compositions described above. Such previously formed coatings may be of the crystalline or amorphous types. Process and compositions for applying such coatings are well known. By way of example, such coatings can include those that are generally referred to as phosphates, chromates, oxalates, and oxides (anodized or chemically converted) coatings.

There follows a general description of conditions under which a coating may be applied in the practice of this invention.

The time of immersion of a metallic surface in the coating composition may vary from as little as 30 seconds to as much as 10 minutes or even longer. As pointed out above, the coating weight, for a particular coating composition and type of metal surface being treated, tends to increase, up to a maximum, as the time of treatment is increased. Once the operating characteristics of a particular coating system have been ascertained, this fact can be exploited to provide a convenient, readily variable, control parameter for securing the desired coating weight. If a light coating is desired, a short treating time can be employed, and when a heavy coating is desired, the treating time can be lengthened. This advantage is unavailable to those using other types of resinous coating compositions because the coating weights obtained with other types of compositions are not, as a practical matter, a function of time.

With respect to coating bath temperature, this is preferably operated anywhere from ambient temperature, that is, from about 20°C. up to about 40°C. Higher temperatures can be used, but temperatures which render the composition unstable should be avoided. Advantages can be obtained by immersing the metallic surface in a heated coating composition. With all factors held constant except the temperature of the coating bath, it has been found that higher weight coatings can be obtained as the temperature of the composition is raised. The coating weight begins to fall off as the temperature exceeds a certain limit, which limit will vary depending on the type of coating-forming material utilized in formulating the coating composition.

It is preferred that relative motion be maintained between the coating composition and the metallic surface immersed therein. This may be accomplished, for example, by stirring the composition with a mixer or by moving the surface in the composition. By maintaining relative motion between the surface and the composition, heavier or thicker coatings can be obtained.

Coatings can be formed from the composition without utilizing electricity as is used in the electrocoat or electrodeposit process for painting metals. The metallic surface may have an electrical charge as a result of being immersed in the coating composition, but a charge applied from an external source is not needed.

It is noted that numerous examples showing the use of coating compositions of the type described above to apply resinous coatings to metallic surfaces are set forth in the aforementioned patents.

The organic coating-forming material in the coating compositions described in detail above is a resinous or polymeric plastic type material. However, as disclosed in aforementioned U.S. Pat. No. 3,585,084, the organic coating-forming material can be also a non-resinous material such as a fatty acid, for example, stearic acid. Coating compositions containing fatty acids and other coating-forming materials are described in detail in pending U.S. patent application Ser. No. 152,992, filed June 14, 1971 (now U.S. Pat. No. 3,776,848) in the names of Hall and Steinbrecher. The coating compositions described in said application are particularly useful in applying to metallic surfaces coatings which have lubricating properties. The organic coating-forming material used in these coating compositions is an organic lubricant. Such coating compositions can be treated also in accordance with this invention to maintain their stability as they are used to coat quantities of metal.

The coating composition described in the aforementioned application comprises an acidic aqueous coating composition containing an organic lubricant and an oxidizing agent. The coating composition can be used to apply lubricating coatings to metallic surfaces which are to be subjected to metal working operations such as forging, extruding, drawing, stamping, molding, etc. The coatings function to avoid or deter the marring or seizing of the metallic surface; in addition, wear of the die surface of the metal working apparatus is reduced.

Any organic lubricant which is capable of forming a coating on a metallic surface from the acidic, water-based composition described above can be used. The vast majority of the organic lubricants are insoluble in an acidic aqueous medium. However, such insoluble lubricants can be used provided they are capable of being water-solubilized or are dispersible in the water phase of the composition in the form of liquid or solid particles. In accordance with known methods, this can be done with the aid of surfactants such as emulsifiers, dispersants, wetting agents, etc.

Examples of organic lubricants that can be used are: fatty oils; fatty acids, waxes; and mineral oils. These broad classes of lubricants include materials such as, for example: sulfurized fatty oils and fatty oils from animals, vegetables and fish; waxes of mineral, vegetable, animal or synthetic origin; modified minerals such as sulfurized mineral oil and light solvents and neutral oils. Such materials, which are well known, can be used alone or in combination as the coating-forming lubricant in the acidic aqueous coating composition provided that they are capable of being uniformly distributed throughout the acidic aqueous phase of the composition. Organic lubricants which cannot be so distributed will tend to separate from the aqueous phase as by precipitating or forming a water immiscible layer.

Distributing the solid or liquid coating-forming lubricant in the aqueous phase of the composition can be carried out according to known techniques. For example, a mixture of solid organic lubricant and emulsifiers or dispersants can be melted and the resulting melt can be dispersed by adding thereto, with stirring, water which has been heated to a temperature above the melting point of the mixture.

By way of a specific example, stearic acid, a preferred coating-forming lubricant and one which is a solid at room temperature, can be dispersed in water according to known methods. For example, a mixture of stearic acid and dispersing agents can be heated to the melting point of the stearic acid, about 70°C; water heated to about the same temperature can be added slowly with good agitation to the molten mixture until the emulsion inverts from water-in-oil to oil-in-water. Thereafter, the remainder of the water can be added more rapidly. Stirring of the dispersion should be continued as the remainder of the water is added and during cooling also. To this dispersion, there can be added the acid and oxidizing agent. The resultant coating composition can be characterized as an acidic aqueous solution of an oxidizing agent having dispersed therein particles of stearic acid. This method is exemplary of the way other water insoluble solid organic lubricants can be dispersed in water. Aqueous dispersions can be made from water insoluble or immiscible liquid organic lubricants by similar procedures carried out at ambient temperature.

The amount of coating-forming lubricant that can be used in the composition can vary over a wide range. The lower concentration limit is dictated by the amount of lubricant needed to provide sufficient material to form a coating on the metallic surface. This will vary depending on the specific coating-forming lubricant that is used. The upper limit is governed by the amount of lubricant that is capable of being incorporated uniformly throughout the acidic aqueous phase of the composition at a viscosity suitable for application. This, too, will tend to vary depending on the specific coating-forming lubricant that is used. In general, heavier lubricating coatings will be formed the higher the concentration of lubricant present in the composition, other variables held constant. A preferred coating composition for forming lubricant coatings contains about 20 g/l to about 80 g/l of stearic acid.

The acidity of the coating composition containing the lubricant can vary over a wide range also and is influenced by the other ingredients comprising the composition, particularly the specific lubricant used. Guidelines for determining an operating pH are as follows. The pH should not be so low that the composition etches, but does not coat, the metallic surface. As the pH is increased above the value at which only etching of the metallic surface is effected heavier and heavier coatings can be formed until, for any given composition, a maximum coating weight is obtained; this will generally occur at a pH well below 7. As the pH is increased toward 7, the coating weights begin to decrease and coatings which appear to be comprised primarily of inorganic materials are produced. The optimum pH range for any given composition may be best determined from experience. A pH range of about 2 to about 5 is recommended for the deposition of stearic acid coatings.

The preferred aqueous acidic lubricating coating composition of this invention contains fluoride ion. The preferred method for making the composition acidic and adding fluoride ion comprises the use of hydrofluoric acid. This acid permits a simple means for control over pH requirements of the composition and obviates the need for introducing the fluoride ion in the form of an alkali metal, ammonium or other salt. While lubricating coatings can be obtained by adding the fluoride in salt form, it is preferred to utilize hydrofluoric acid and avoid the use of salts which may give rise to undesirable cations in the coating composition or complicate pH adjustment. If the fluoride component is added in the form of a salt, the pH of the composition can be adjusted by the use of acids other than hydrofluoric or in combination with hydrofluoric. Examples of such acids include sulfuric, phosphoric, nitric and hydrochloric.

With respect to the fluoride ion concentration, amounts within the range of about 2 to 8 g/l of composition (calculated as F) are preferred. Nevertheless, higher or lower amounts can be utilized. Other variables held constant, an insufficient amount of fluoride tends to produce coatings which are thinner than desired; an excess amount of fluoride tends to form coatings which do not adhere satisfactorily to the metal substrate.

The oxidizing agent used in the preferred coating composition is a peroxide. Although metal peroxides such as alkali and alkaline earth metal peroxides can be used, the use of hydrogen peroxide is most preferred. The hydrogen peroxide can be added conveniently to the composition in the form of a 30 percent aqueous solution of hydrogen peroxide.

The preferred amount of oxidizing agent is an amount sufficient to provide an oxidizing equivalent of about 0.1 to about 0.2 in one liter of the composition.

Optional ingredients or additives which commonly are used with metal working lubricants can be added to the composition. Examples of such materials are rust preventatives, odor control agents, antiseptics, etc.

Lubricating coatings formed from the above-described composition have properties which prevent metal-to-metal contact thereby facilitating metal deformation without galling, scratching, etc. Analyses of the coatings have shown that they are comprised of both inorganic and organic components. The inorganic component appears to be comprised primarily of metal salts of the base metal. The organic component comprises the organic lubricant ingredient of the coating composition. In depositing stearic acid coatings, the organic component can vary over a wide range, for example about 25 wt. to about 95 wt. percent.

Prior to applying the coating composition, the metallic surface should be cleaned.

The contact time between the coating composition and the metallic surface immersed therein can be controlled as desired. Suitable coatings having lubricating properties can be formed usually within about 15 seconds to about 5 minutes. The longer the metallic surface is immersed in the coating composition the greater the thickness or the weight of the coating. Analyses of coatings show that the inorganic materials which make up the coatings comprise an increasing proportion of the coating the longer the metallic substrate has been immersed in the coating composition.

The coating bath is operated preferably at ambient temperature. Elevated temperatures can be used, but temperatures which cause the bath to become unstable should be avoided. In working with stearic acid baths, it was noted that temperatures in excess of about 100°F tended to produce coatings with poor adhesion.

It is preferred that relative motion be maintained between the coating composition and the metallic surface immersed therein. This facilitates coating formation and improves coating continuity and adhesion.

As mentioned hereinabove, continued use of the coating compositions to which this invention relates can lead to their becoming unstable as a result of the buildup of excess metallic ions. By way of explanation, it is noted that the metal ions which are dissolved from the metal surface by the coating composition cause, directly or indirectly, the organic-coating forming material of the composition at the face of the metallic surface to become unstable and deposit on the surface to form the coating. The exact mechanism by which the metal ions function to render the organic-coating forming material unstable in the region of the metal surface can vary depending on the type of organic coating-forming material used and the type of metal being coated.

For illustrative purposes, certain aspects of the present invention are described in connection with a process utilizing the following coating composition:

COMPOSITION A

| Ingredients | Amount, g/l |
| --- | --- |
| A) latex comprising 56 wt. % of a copolymer of styrene butadiene resin solids dispersed in water | about 80 to about 300 |
| B) hydrofluoric acid | about 1.0 to about 5.0 |
| C) hydrogen peroxide | about 1.5 to about 6.0 |
| D) phosphoric acid | about 1.5 to about 2.5 |
| E) water | to make 1 liter |

The above type coating composition, which should have a pH of about 1.6 to about 3.0, has been used to form very attractive coatings on iron or steel surfaces; the coatings have excellent corrosion resistant properties and adhere very tightly to the iron substrate. The phosphoric acid improves the corrosion resistant properties of the coatings. The resinous coating-forming ingredient, a styrene-butadiene copolymer, is dispersed uniformly in the aqueous phase of the composition by nonionic surfactants associated therewith. When iron is immersed in the composition, the surface thereof is dissolved by the composition to form ferrous ions which are oxidized by the oxidizing agent, $H_2O_2$. The ferric ions render the dispersed resin particles unstable at the interface of the iron surface. It is believed that they render the dispersing agent ineffective for maintaining the resin particles in their dispersed state. The destabilized resin particles deposit on the iron surface to form thereon a coating. However, as additional iron or steel surfaces are immersed in the composition, the amount of ferric ions in the composition builds up with the result that the dispersed resin becomes unstable, not only in the region of the metallic surface, but also in other portions of the coating composition. As this occurs, the dispersed resin tends to coagulate, flocculate or gel and the coating bath can become useless.

The mechanism by which other types of coating compositions used to coat iron or other types of metallic surfaces function may differ to some extent from the mechanism described above. For example, the metal ions which are the precursors of coating formation and/or those which are the precursors of bath instability may be in a complex form; or they may not be oxidized from the valence state which they assumed when they were dissolved initially. Also, the metal ions may act directly on the organic coating-forming material in rendering it unstable. Whatever the exact mechanism, suffice it to say that continued operation of a bath of the coating composition of the type to which this invention relates can be prolonged or operated indefinitely by treating the composition with an ion exchange material which will remove the metal ions which cause, in one way or another, a bath of the composition to become unstable.

The ion exchange material used in treating the coating composition should be one which removes the metal ions which build up in the composition and cause it to become unstable. The identity of the metal ions can be determined by analyzing the composition. The ion exchange material, which should be effective in acidic mediums comprising the composition, and preferably one which is particularly effective in the pH range of the composition, should be preferably one which extracts selectively the excess metal ions from the coating composition. Speaking generally, the ion exchange material can be either a cation exchange material or an amphoteric exchange material, the former being much preferred. An amphoteric exchanger may remove desirable anions from the bath, as well as the excess metal ions.

The ion exchange material may be a natural occuring material, in its original or modified form, such as, for example, sulfonated coal and zeolites. It is much preferred to use cation exchange resins because they generally have higher exchange capacities. The types of cation exchange resins presently available, and ones popularly used, contain functional groups such as sulfonic, carboxylic, phenolic, phosphonic and imminodiacetate groups. In treating a coating composition of the A-type above which is used to coat iron surfaces, it is preferred to use a cation exchange material having a sulfonic functional group because this gives excellent exchange capacity.

A list of exemplary ion exchange materials which can be used to treat coating compositions in accordance with this invention is set forth below.

continued operation and treatment of the coating composition, such metal ions may have an adverse effect on the coating bath and/or on the coatings being formed. For example, the introduction into the coating bath of a sufficient amount of extraneous metal ions may cause the bath to become unstable. Also, the corrosion resistance of the coatings may be reduced by the presence of extraneous metal ions in the bath composition.

In treating coating compositions with an ion exchange material, it may be found that the coating composition changes the physical form of an ion exchange material used. For example, beads of an ion exchange material may be fractured upon being contacted with the coating composition; in effect, the beads tend to weaken and crumble. Although this may not affect adversely the exchange capacity of the ion exchange material, it may lead to other problems, for example clogging of an ion exchange column charged with the beads. In accordance with this invention, it has been found that this problem can be minimized by utilizing a more highly crosslinked ion exchange material.

By way of example, it is noted that when a coating composition of the type of Composition A above was treated in an ion exchange column of beads of an ion exchange material comprising Amberlite IR–120, the composition fractured the beads and caused them to crumble. This was minimized by replacing the aforementioned beads with ion exchange beads comprising Amberlyst 15, a more highly crosslinked ion exchange resin.

In view of the numerous variables which are inherent in the use of the coating compositions to which this invention relates, it is impractical, if not impossible, to state a numerical value at which the excess metal ions in the coating composition cause it to become unstable.

| | |
|---|---|
| Amberlite IR-120 (polystyrene nucleated sulfonic acid crosslinked with divinylbenzene) | (Rohm & Haas Co.) |
| Amberlite IR-200 (polystyrene sulfonic acid crosslinked with divinylbenzene) | (Rohm & Haas Co.) |
| Amberlyst-15 (nucleated polystyrene sulfonic acid) | (Rohm & Haas Co.) |
| Dowex-50WX8 (polystyrene sulfonic acid crosslinked with divinylbenzene) | (Dow Chemical Co.) |
| Ion Exchange Resin C-267 (sulfonated polystyrene, 10% crosslinked with divinylbenzene) | (J. T. Baker Chemical Co.) |
| Ion Exchange Resin AGC-243 (sulfonated polystyrene, 12.5% crosslinked with divinylbenzene) | (J. T. Baker Chemical Co.) |

For a particular application, the functional group and the replaceable cation thereof of the exchange material can be selected on the basis of the relative replacing power of the cation for exchange with the particular excess metal ion which is to be extracted from the coating composition. On the basis of available information respecting the exchange properties of the functional groups and replaceable cations thereof, it may appear advantageous to utilize an ion exchange material that contains replaceable metal ions instead of replaceable hydrogen ions. However, for long term use for maintaining the coating composition stable, it is important that the ion exchange material contain replaceable hydrogen ions rather than replaceable metal ions. It is noted that the replaceable cation of the ion exchange material is released into the coating composition contacted therewith. Thus the use of an ion exchange material which contains replaceable hydrogen ions releases hydrogen ions into the acidic aqueous coating composition. As such, extraneous cations are not introduced into the composition. On the other hand, the use of an ion exchange material which contains replaceable metal ions will release such ions, which may be extraneous material, into the coating composition. Through The following factors can have a bearing: the type of metal being coated; the specific type of organic coating-forming material comprising the composition; the types and amounts of dispersing agents in the composition; the rate of throughput of metallic surfaces in the composition; the extent to which the composition ionizes metal from the metallic surfaces; and the age of the bath. For this reason, it has been found more expedient to make certain empirical determinations respecting the operating characteristics of specific processes, and then utilize these determinations as guidelines for adjusting or controlling the amount of excess metal ions which cause the coating compositions to become unstable. Information gathered from these empirical determinations can be used to determine the necessary rate of removal of excess metal ion from the composition, and the upper limit of metal ion concentration. This data can be used, in turn, to determine how much ion exchange material should be used as will be explained in detail below.

In general, it will be most convenient to make the empirical determinations on a test bath and then utilize information gathered from the determinations in operating a production bath. Periodic analysis of the metal content of an operating bath is the preferred way for determining when excess metal ions should be removed and the amount thereof that should be removed. It has been found, for any given coating operation, the composition will become unstable when the metal ions build up to a certain value. By operating a given coating composition to a state of instability and recording the metal ion content, the concentration at which any given composition in a particular operation tends to become unstable under the operating conditions can be determined. This information can be used in a future like operation to avoid destabilization of the composition. By recording the metal ion concentration of the composition as metallic surfaces are processed through it, steps, as outlined above can be taken to avoid instability. Excess metal ions can be removed from the bath by use of the ion exchange material thereby reducing the concentration thereof in the composition.

By way of example, it is noted that in utilizing a coating composition of the type of Composition A above to coat iron or steel surfaces, the composition tended to become unstable as the ferric ion concentration exceeded about 1.5 g/l. However, a bath of the composition could be operated for prolonged periods by replenishing the ingredients as they were consumed and removing ferric ions periodically as their concentration approached about 1.5 g/l by treatment with an ion exchange material.

The coating composition can be treated with the ion exchange material in any suitable way. For example, it can be contacted with ion exchange membranes, ion exchange fabrics, or it can be passed through a column of ion exchange beads.

The coating composition can be contacted with the ion exchange material on a continuous or periodic basis. In operating on a continuous basis, the metal ion content can be maintained at a constant level which is below that at which the metal ion tends to cause destabilization of the composition. In operating on a periodical basis, the metal ion content can be allowed to increase to a predetermined tolerable level before removing it to a desirable level.

The ion exchange material should be regenerated, as needed, in order to restore its ion exchange capacity. Regeneration involves displacing the metal ions adsorbed by the ion exchange material, and replacing them with cations which will in turn be replaced by the metal ions to be removed from the composition. For example, in using an ion exchange column packed with beads of the ion exchange material, flow of the coating composition through the column is terminated. Thereafter, the column is rinsed preferably with water to reclaim residual coating composition in the column. Removal of residual coating composition from the column also avoids any tendency for the composition to be coagulated by the material used to regenerate the ion exchange beads comprising the column. The column can be rinsed conveniently by running water therethrough. It is preferred to use deionized water. Hard water has a tendency to decrease the capacity of the ion exchange material for the metal ions which are to be removed.

The type of regenerating material (often referred to as "eluant") used will depend on the nature of the ion exchange material. When utilizing an ion exchange material that includes a replaceable hydrogen ion, regeneration can be effected by contacting the material with an aqueous solution of a strong acid. For example, an aqueous solution of sulphuric, hydrochloric, phosphoric, or nitric acid can be passed through an ion exchange column to regenerate the beads therein. In regenerating an ion exchange material which has a replaceable cation, other than hydrogen, a concentrated aqueous solution of a salt containing the cation can be used. For example, if the ion exchange material contains sodium cation, an aqueous solution of brine can be used as the regenerating material or eluant.

It is noted that the ion exchange material will generally be selected for use on the basis of its affinity for the metal ion to be extracted from the coating composition. Thus, high concentrations of the regenerating material should be passed through the column to remove therefrom the metal ions.

The efficiency of regeneration of the ion exchange material can be increased by adding to the regenerating material a sequestering agent for sequestering the metal ion which is displaced from the ion exchange material. This ties up the metal ion and prevents it from being readsorbed by the ion exchange material. In displacing iron ions from the ion exchange material particularly good results have been obtained by utilizing oxalic acid as a sequestering agent. Examples of other sequestering agents that can be used include citric acid and glycolic acid. The sequestering agent should be used in an amount such that it increases the efficiency of metal ion removal from the ion exchange resin without greatly increasing the cost of regeneration. For example, the regenerating material can comprise 10 gallons of 10–20 percent $H_2SO_4$ and 100–200 g of oxalic acid per cubic foot of ion exchange resin.

After the ion exchange material has been treated with the regenerating material, residual extraneous materials that emanate from the use of the regenerating material should be removed from the ion exchange material. This can be accomplished by rinsing the ion exchange material with water, preferably deionized water. To illustrate the importance of this step, it is noted that regeneration of the ion exchange material may leave deposited thereon extraneous anions which are capable of being picked up by the coating composition that is subsequently contacted therewith. The presence of such anions in the coating composition may affect adversely desired coating properties, such as wet adhesion.

In some applications wherein the ion exchange material has been regenerated with an eluant that contains no extraneous ions, the amount of rinsing of the regenerated ion exchange material can be reduced. For example, and as mentioned above, phosphoric acid can be included in the coating composition to enhance the corrosion resistant properties of the coating. Also, phosphoric acid can be used as a regenerating material. Its use will not leave extraneous ions on the ion exchange material which need necessarily be thoroughly removed therefrom.

With respect to the amount of ion exchange material to be used, it is noted that the ion exchange capacity of available ion exchange materials is usually reported in the literature; if not, the ion exchange capacity can be determined readily. It has been observed that the coating compositions of the type to which this invention relates usually dissolve, in any given operation, about the same amount of metal ion from the metallic surfaces treated therein. Thus, knowing the amount or square feet of metallic surfaces that are to be treated in the coating composition, the amount of metal ion that is likely to build up in a bath of the coating composition can be calculated from empirical determinations. Similarly, the amount of metallic ion in the composition that is likely to cause the bath to become unstable can be calculated also from empirical determinations of the type described hereinabove. This information, coupled with knowledge of the ion exchange capacity of the ion exchange material, can be used to determine the amount of ion exchange material that is needed to extract a given amount of metallic ion in a given operation. Stoichiometric amounts of the ion exchange material can be used to extract a predetermined amount of metallic ion.

However, it has been found that the peculiar nature of the coating composition to which this invention relates makes it very advantageous to use excess amounts of the ion exchange material. This provides for more efficient operation in maintaining the stability of the coating composition over more prolonged periods of time. By way of example, it is noted that resin beads of an ion exchange material sold as Amberlyst 15 and comprising polystyrene sulfonic acid is reported to have an ion exchange capacity of about 1.5 to about 2.0 pounds of iron per cubic foot of beads. However, in treating a coating composition of the A-type above that was used to coat iron surfaces with the aforementioned ion exchange beads, it was found that the beads were effective in removing only about 1 pound of iron per cubic foot of beads. Accordingly, more than 2 cubic feet of beads were used because in this particular operation it was desired to remove more than 1 pound of iron from the coating composition.

The extent to which additional amounts of ion exchange material are used to provide the desired ion exchange capacity for a particular application is best determined from experience in view of the numerous variables inherent in the process. However, for guideline purposes, it is recommended that there be used an amount of ion exchange material sufficient to provide an ion exchange capacity at least 30 percent above the expected or reported capacity.

The removal of metal ions from the coating composition by the use of an ion exchange mamterial, as described above, is effective in prolonging the stability of the coating composition. However, it has been found that a coating composition may destabilize as it is used to coat metallic objects, notwithstanding the removal therefrom of metal ions. In essence, removal of the metal ions by the use of the ion exchange material is effective in prolonging stability of the composition, but for applications in which it is desired that the composition be used for more prolonged periods of time (even indefinite periods of time), other steps must be taken to maintain the coating composition in a stable state. It has been found that to achieve more prolonged stability of a coating composition, steps must be taken to control the surface tension of the composition within certain operating ranges. This can be accomplished by adding to the coating composition a dispersing agent or surfactant for maintaining the dispersed coating-forming particles in their dispersed state. As will be explained in detail below, the amount of dispersing agent added to the composition is an amount over and above that which is normally incorporated in the aqueous dispersion of coating-forming particles.

By way of explanation, it is noted that as the coating composition is used, the surface tension thereof begins to rise and continues to rise, eventually to a value at which the coating-forming materials flocculate, gel, or coagulate throughout the composition thereby rendering it inoperative. Removal of metal ions from the composition by the use of an ion exchange material, as described above, may lower the surface tension of the composition somewhat and will prolong the stability of the composition. However, it has been found that even though the concentration of the metal ions is maintained at a tolerable level, that is, at a level at which the stability of the composition is prolonged, continued use of the composition can result in a destabilization thereof if steps are not taken to lower the surface tension by adding to the composition additional surfactant or dispersing agent.

By way of example, it is noted that the latex used in preparing a composition of the type of composition A above, had a surface tension of about 33 dynes/centimenter. (Other latices, which are commercially available, generally have a surface tension within the range of about 30 to about 50 dynes/centimeter.) The addition of acid and other ingredients to such latices does not affect the surface tension thereof to any significant degree so that coating compositions prepared from such latices can have a like surface tension. (The surface tension of pure water is about 72 dynes/centimeter.) In coating steel panels with the aforementioned type of composition, it has been found that the composition tends to become unstable as the surface tension rises to about 40 to about 50 dynes/centimeter, notwithstanding that the stability of the composition was prolonged initially by maintaining the metal ion concentration of the composition at a tolerable level, for example, below about 1.5 g/l, by treating the composition with an ion exchange material.

Any suitable dispersing agent or surfactant for the dispersed coating-forming material can be added to the bath of coating composition to maintain the surface tension thereof at a desirable and stabilizing level. In general, the dispersing agent will be of the anionic or nonionic type. Mixtures of such dispersing agents can be used also. Preferably, the dispersing agent should be the one present in the aqueous coating-forming dispersion used in formulating the coating composition. Examples of classes of anionic dispersing agents that can be used are: sulfuric acid esters; sulfonic acids; and various types of carboxylic acids. Examples of classes of nonionic dispersing agents that can be used are: ethoxylated alkylphenols; varius types of esters and amides; aliphatic polyethers; alkyl aryl polyethers; and alkyl or alkylaryl thioethers. Specific examples of dispersing agents that can be used include: nonyl phenoxy polyethoxy ethanol; octyl phenoxy polyethoxy ethanol; glycerol monolaurate; sodium 2-ethylhexyl sulfate; dioctyl ester of sodium sulfosuccinic acid; sodium isopropyl naphthalene sulfonate and sodium lauryl sulfate.

As mentioned above, the amount of dispersing agent used for prolonging stability of the bath of the coating composition is an amount over and above that which is normally present in an aqueous dispersion of coating-forming particles. By way of background, it is noted that particles of resin in an aqueous resin dispersion or latex are maintained in their dispersed state by one or more dispersing agents which are associated with the particles, as by being absorbed on the surfaces of the individual particles. Such dispersions are generally made by emulsion polymerization in which one or more monomers are polymerized in water in the presence of dispersing agents or emulsifiers which function to solubilize the monomer, suspend monomer droplets, and suspend the polymeric particles which are produced by the polymerizable reaction. Another method for preparing resin dispersions is by post emulsification which includes stirring particles of the resin in water which contains a dispersing agent.

The amount of dispersing agent usually present in such dispersions is relatively small, for example, about 0.2 to about 3 wt. percent. The exact composition of most commercially available latices is proprietary information. The latices are difficult to analyze because, in addition to the resin solids, they contain usually many other ingredients, such as preservatives, anti-rust agents, defoamers, pH buffers, protective colloids and plasticizers. Thus, the aqueous resin dispersion used in preparing the coating composition contains dispersant for the coating-forming resin particles.

It is noted also that as the composition is used to form coatings on metallic surfaces, the ingredients thereof are depleted. To maintain the ingredients in coating-forming amounts, they have to be replenished. The resinous ingredient of the composition can be replenished conveniently by adding additional aqueous resin dispersion containing dispersant for the resin to the composition. Thus, additional dispersing agent for the resin is added to the composition during replenishment. However, it has been found that additional dispersing agent for the coating-forming resin in an amount over and above that present in the resin dispersion from which the bath is made up originally or that added to the composition during replenishment is needed to prolong the stability of the composition.

In view of the numerous variables which are associated with the coating composition and process described herein, it is impractical, if not impossible, to state the precise surface tension at which the coating composition will destabilize. This determination can be made best by operating a test bath and then using this information in operating a production bath. By recording the surface tension of a test composition as it operated to a state of instability, the value at which any given composition tends to become unstable under typical operating conditions can be determined. This information can be used in determining the amount of dispersing agent to add to the composition to maintain the surface tension thereof below the value at which the composition tends to destabilize.

Generally speaking, the amount of dispersing agent added will depend on: the type of metal being coated; the specific type of resin dispersion comprising the composition, particularly the dispersing agents associated therewith; the rate of throughput of the metallic surfaces in the composition; the age of the composition; the metallic ion content of the composition; and the specific dispersing agent added to the composition. In view of the numerous variables that are inherent in the coating process, it is difficult, if not impossible, to specify the amount of dispersing agent which should be added to the composition to prolong stability. This is best determined from experience in the operation of a specific coating process. However, for guideline purposes, it is noted that the addition to the coating composition of about 0.1 to about 5 g/l of nonionic and/or anionic dispersing agent can be effective in prolonging stability of the composition. A good general rule to follow is to add the dispersing agent to the composition in an amount which will restore the surface tension thereof to its original value. If too large an amount of dispersing agent is added, the coatings formed by the composition will tend to be thinner, more water sensitive and exhibit lower corrosion resistance. It should be understood that the above amounts are given for guideline purposes and that smaller or higher amounts may be used satisfactorily in a particular coating operation.

By way of example, it is noted that a particular coating composition falling within the description of Composition A above had a surface tension of 39.8 dynes/cm. After processing 4 square feet of steel/liter of the composition, the surface tension thereof rose to 44.4 dynes/cm. Addition of 0.5 g/l of a surface active agent (Triton N-100- nonyl phenoxy polyethoxy ethanol) to the composition lowered the surface tension thereof to 37.0 dynes/centimeter. Past experience had demonstrated that if the surface tension of the composition had been allowed to rise much higher than 44.4 dynes/centimeter, the composition would have destabilized. By lowering the surface tension as described, destabilization was avoided. The aforementioned procedure can be repeated indefinitely as the composition is used to coat metallic surfaces provided that the consumed ingredients thereof are replenished and excess metal ions are removed from the composition.

Although addition of dispersing agent is effective to prolong stability of the composition, this treatment cannot be relied upon exclusively to maintain the composition in a stable state over a long period of time. As the metal ions continue to build up in concentration, further additions of dispersing agent are not effective in maintaining stability indefinitely. Metal ions must be extracted to attain more prolonged stability. For example, in coating steel panels with a composition of the A-type above, the ferric ion concentration was allowed to build up in excess of 1.5 g/l while additional dispersing agent was added to the composition. However, upon continued use of the composition, it was found that it became unstable when the iron concentration in the bath reached about 3 g/l notwithstanding that additional amounts of dispersing agent were added to the composition. For more prolonged use, the composition needed to be treated with the ion exchange material to lower the concentration of the ferric ions.

EXAMPLES

The first group of examples illustrate the use of the present invention to maintain a bath of coating composition stable.

EXAMPLE 1

Four liters of a bath of the following acidic aqueous composition was prepared:

| Ingredients | Amounts, g/l |
| --- | --- |
| latex containing 56 wt.% of sytrene-butadiene resin solids dispersed in water by a nonionic dispersing agent (pliolite 491) | 150 |
| 21% aqueous solution of HF | 15 |
| 35% aqueous solution of $H_2O_2$ | 8 |

-Continued

| Ingredients | Amounts, g/l |
| --- | --- |
| black pigment dispersion (Aquablak 100) | 10 |
| water | to make 1 liter |

Four liters of the above composition were used to coat 16 sq. ft. of steel panels. The composition was then analyzed and found to contain 1.58 g/l of iron. Previous experience with this type of coating operation indicated that the composition was likely to become unstable if the iron concentration was allowed to increase to higher amounts. To avoid destabilization, the composition was passed through an ion exchange column containing about 0.02 cubic feet of ion exchange resin beads comprising polystyrene nucleated sulfonic acid crosslinked with divinylbenzene (Amberlite IR-120). After the coating composition was thus treated, it was found to have an iron concentration of 0.025 g/l. The composition was used to coat additional steel panels and remained stable. The aforementioned process was repeated six times at intervals when the iron concentration built up to about 1.0 to about 1.5 g/l. Each time the ion exchange beads were regenerated with 2,500 ml of 20 percent $H_2SO_4$.

EXAMPLE 2

The following acidic aqueous composition was prepared:

| Ingredients | Amounts, g/l |
| --- | --- |
| latex containing 56 wt. % of styrene-butadiene resin solids dispersed in water by a nonionic dispersing agent (Plilote 491) | 75 |
| 21% aqueous solution of HF | 8 |
| 35% aqueous solution of $H_2O_2$ | 4 |
| black pigment dispersion (Aquablak 100) | 3 |
| water | to make 1 liter |

A 4-liter bath of the above composition was used to coat 4 by 6 inches steel panels by immersing the panels in the composition for three minutes one after the other. The panels withdrawn from the composition were rinsed, baked and found to have a coating thickness of about 0.8 mil. The number of panels coated was such that 120 sq. ft. of steel panels were coated in the bath of composition. At the start of the coating operation and thereafter, the composition was analyzed for iron content. Previous experience with this type of coating operation indicated that the composition would tend to destabilize when the iron concentration in the composition built up in excess of about 1 – 1.5 g/l. In order to avoid destabilization due to excess iron content, the coating composition was passed through an ion exchange column containing 150 ml of cation exchange resin beads (Amberlyst 15) when the iron concentration reached about 0.5 – 1 g/l. As additional panels were processed in the composition, and as the composition was passed continuously through the ion exchange column, the composition and the effluent from the column were analyzed for iron content. Whenever the iron concentration in the effluent from the ion exchange column was about the same as that in the composition, the coating operation was stopped, the resin beads were rinsed with water, and thereafter were regenerated. This was effected by rinsing the column with 20 volume percent of sulfuric acid, after which the beads were again rinsed with water. Overall, the column was regenerated 27 different times during the coating operation. By passing the composition through the ion exchange column, the iron concentration in the composition was maintained at about 0.5 – 1 g/l. In addition to removing iron from the composition in the aforementioned manner, the ingredients of the composition that were consumed during use were replenished; also, in order to maintain stability, a nonionic surface active agent was added to the composition. (The surface tension of the originally prepared composition was about 38 dynes/cm; experience with this type of coating operation indicated that the composition would destabilize if the surface tension was allowed to rise to about 45–50 dynes/cm.) Replenishment of ingredients and addition of the surface active agent were made by continuously adding to the composition the ingredients set forth below, the amounts of ingredients given below being the total amounts of ingredients that were added to the composition during the entire coating operation.

| Ingredients | |
| --- | --- |
| latex containing 56 wt. % of styrene-butadiene resin solids dispersed in water by a nonionic dispersing agent (Pliolite 491) | 370 g |
| 21% aqueous solution of HF | 186 g |
| 35% aqueous solution of $H_2O_2$ | 268 g |
| black pigment dispersion (Aquablak 100) | 18.6 g |
| nonyl phenoxy polyethoxy ethanol (Triton N 100 nonionic surface active agent) | 12.1 g |

By continuously replenishing the composition and adding thereto the nonionic surfactant, the amounts of ingredients in the composition were maintained at a substantially constant level and the surface tension thereof was maintained below about 40 dynes/cm.

By following the above procedure, the coating composition was prevented from destabilizing. Calculations showed that during the coating operation, a total of about 42 g of iron was dissolved from the panels treated in the bath. At the end of of the coating operation, analysis of the coating composition showed that the iron content thereof was about 0.869 g/l. The ion exchange column was effective in removing a total of about 38.52 g of iron from the composition during the coating operation.

It is noted that the process described in Example 2 above can be characterized as a "semi-continuous" process in that the coating operation was terminated in order to regenerate the ion exchange column. Termination of the coating process could be avoided and the process made continuous by utilizing two ion exchange columns, one of which can be used to remove metal ions from the coating composition while the other is being regenerated.

CONTINUATION OF DETAILED DESCRIPTION OF THE INVENTION

As mentioned above, it has been observed that coating compositions of the type to which this invention relates can function to form on metallic substrates smooth and/or glossy coatings before they are treated with the ion exchange material as described above. However, after treatment with the ion exchange material, the coating composition can tend to form on the metallic surfaces coatings which are grainy or textured in appearance. If this type of coating is not desired, the use of a dispersing agent for maintaining the smaller particles of organic coating-forming material in the coating composition should be employed in accordance with this invention. Excellent results have been obtained by using a surfactant having cationic properties in the acidic aqueous composition.

Surprisingly, nonionic and anionic surfactants are not effective in avoiding or minimizing the textured appearance of coatings formed from a coating composition that has been subjected to the ion exchange material.

In accordance with this invention, a cationic surfactant or an amphoteric surfactant which in the acidic medium of the coating composition has cationic properties, can be used to minimize or avoid the formation of textured coatings. Mixtures of these surfactants can be used also. In addition, a protective colloid, alone or in combination with the aforementioned surfactants, can be used.

Any cationic surfactant can be used. Many of the presently available cationic surfactants are simple amine salts, quaternary ammonium salts or amino amides and amidazolines. Examples of cationic surfactants include: aliphatic primary amine acetates having the formula $RNH_3COOCH_3$, wherein R is an aliphatic hydrocarbon group having about 8 to about 18 carbon atoms, for example, undecylamine acetate, heptadecylamine acetate and octadecylamine acetate; polycondensation products obtained by reacting dicyanodiamides, dicyanodiamidine, guanidines, or diguanidines with formaldehyde; picolinium salts, for example, lauryl picolinium bromide; polyoxethylene alkyl amines, for example, tetradecaoxyethylene pentadecylamine and dioctaoxyethylene heptadecylamine; pyridinium salts, for example, cetylpyridinium bromide and lauramidomethyl pyridinium chloride; quaternary ammonium salts, for example, trimethyloctadecyl ammonium chloride; trimethylcetyl ammonium bromide, and dimethylcetylbenzyl ammonium chloride. Other cationic surfactants can be used and mixtures thereof can be used. Many of the presently available amphoteric surfactants contain amino and carboxyl groups or amino and sulfuric ester or sulfonic groups. Examples of amphoteric surfactants that can be used are: N-coco beta-amino propionic acid; N-lauryl, myristyl beta-amino propionic acid; and compounds of the formula:

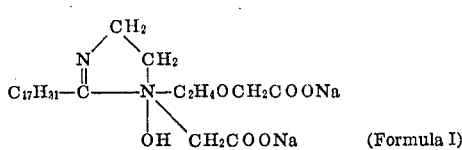 (Formula I)

and

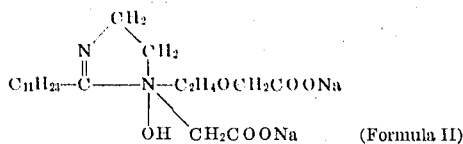 (Formula II)

Amphoteric surfactants are sold by the Miranol Chemical Co., Inc. under the trademarks Miranol L2M-SF (Formula I above) and Miranol C2M-AA (Formula II above) and by General Mills, Inc. under the trademarks Deriphat 151C (N-coco beta-amino propionic acid) and Deriphat 170C (N-lauryl, myristyl beta-amino propionic acid).

Other dispersing agents that can be used to minimize or avoid the formation of textured coatings include protective colloids. The protective colloid selected for use should be a stable material, that is, a material which is not degraded by the acidic coating composition. Examples of protective colloids that can be used are water soluble cellulose such as hydroxyethyl cellulose, methyl cellulose, carboxymethyl cellulose and synthetic resinous materials, such as polyoxyethylene, polyacrylic acid and polymethacrylic acid.

In the practice of this invention, it is preferred to use surfactants having cationic properties. The use of protective colloids, particularly hydrophilic protective colloids, can result in a reduction in the corrosion resistance of the coatings; this has not been observed in the use of surfactants having cationic properties.

The dispersing agent must be present when the coating composition is contacted with the ion exchange material. This can be effected conveniently by incorporating the dispersing agent into the coating composition before it is treated with the ion exchange material. Other methods for effecting this can be used also. For example, the dispersing agent or an aqueous solution thereof can be added to a column of ion exchange resin beads; also, an ion exchange membrane or fabric can be impregnated or saturated with the dispersing agent.

The dispersing agent should be used in an amount at least sufficient to reduce the texture of the coatings to the desired degree. This will be influenced by a number of factors, for example: the specific dispersing agent used; the specific type of coating composition, and particularly the specific type and amount of organic coating-forming material used, and the particle size and particle size distribution thereof. In view of the number of different variables that are inherent in the use of this invention, it is recommended that for any particular coating operation, the amount of the dispersing agent used be determined from empirical observations, that is, by using different amounts of the dispersing agent until an amount which gives coatings of the desired smoothness has been employed. It appears that there is no upper limit on the amount of dispersant that can be used with respect to its functioning to reduce texturing.

There are guidelines which can be used in determining the maximum and minimum amounts of dispersing agent used. For example, the use of relatively high amounts of the dispersing agent can reduce the corrosion resistance of the coatings. This may be disadvantageous if coatings with such properties are desired. Also, it has been found that the rate of coating formation on the metallic substrate may be reduced by utilizinng relatively high amounts of the dispersing agent. As will be explained in more detail below, relatively high amounts of certain types of dispersing agent may cause a coating composition formulated from certain types of latices to destabilize. It has been found that there are ranges of concentrations of the dispersing agent which can be used to reduce or avoid the formation of grainy or textured coatings without causing the aforementioned problems.

For guideline purposes, it is noted that coatings having reduced texture and improved smoothness have been obtained by utilizing at least about 0.05 g/l, and preferably at least about 0.1 g/l, of the dispersing agent in the coating composition. Coatings with particularly good smoothness have been obtained by utilizing at least about 0.2 g/l of the dispersing agent. Amounts in excess of about 0.5 g/l of the dispersing agent have been found to result in coatings having reduced corrosion resistance, and higher amounts can lead to the other problems mentioned above, said higher amounts being influenced by the particular combination of variables used in a particular process. It should be understood that the effectiveness of the dispersing agents can vary, for example, some being more effective at lower concentrations than others. Thus, experience may show the desirability of departing from the aforementioned guidelines respecting amounts. The desired results can be achieved readily by adjusting the concentration of the dispersing agent.

As mentioned above, latices contain anionic or nonionic materials which have surface active properties for maintaining the resin particles dispersed therein. Such latices usually contain protective colloids also, for example, in amounts of 0.1 to 1 wt. percent. The presence in the latex of such anionic and/or nonionic surfactants is effective in maintaining the smaller sized resin particles dispersed in the composition before it is treated with the ion exchange material, but not after it is so treated. This requires the use of the dispersing agent of this invention, for example, the cationic or amphoteric surfactant or the protective colloid in amounts over and above that which may be present in the latex.

Generally speaking, the size of the resin particles dispersed in a latex ranges from about 0.01 to about 0.5 micron. It is believed that when the coating composition containing the latex is contacted with an ion exchange material, the smaller sized particles of dispersed resin, for example, those of size about 0.01 to about 0.1 micron, coalesce with each other or with larger particles or they are physically adsorbed to the ion exchange resin. It is believed also that this leads to the formation of textured coatings when the composition is used subsequently. Although it is believed that this explanation respecting the source of the texturing problem is accurate, the problem may arise as a result of other phenomenon. Whatever the source of the problem, the use of the cationic or amphoteric surfactants or the protective colloid alleviates it.

As pointed out above, latices contain anionic or nonionic dispersing agents or mixtures thereof which maintain the resin particles of the latex dispersed therein. (For convenience, a latex in which the resin particles are dispersed by an anionic dispersing agent is referred to hereafter as an "anionically dispersed latex," and a latex in which the resin particles are dispersed by a nonionic dispersing agent is referred to hereafter as a "nonionically dispersed latex.") In the development of this invention, it has been found that a cationic or amphoteric dispersing agent can be readily and satisfactorily incorporated in a coating composition containing a nonionically dispersed latex, but that certain precautions may have to be taken when these dispersing agents are incorporated into a coating composition containing an anionically dispersed latex. Speaking generally, it has been found that there is a risk that the addition of an amphoteric or cationic dispersing agent to an acidic aqueous coating composition containing an anionically dispersed latex will cause the coating composition to destabilize by gelling, coagulating etc.

It is believed that destabilization occurs as a result of the amphoteric or cationic dispersing agent neutralizing the charges of the anionic dispersing agent of the latex, thereby rendering the anionic dispersing agent ineffective for maintaining the resin particles of the coating composition in their dispersed state. If this occurs, certain formulating techniques should be used in combining the amphoteric or cationic dispersing agent with the anionically dispersed latex. In accordance with the present invention, the recommended technique is to add the cationic or amphoteric dispersing agent to the anionically dispersed latex before the latex is acidified; thereafter, the resulting composition can be acidified by adding acid thereto to produce the desired acidic aqueous coating composition. In preferred form, the amphoteric or cationic surfactant should be diluted with water first, for example, to a concentration of about 1.0 to about 20 g/l of active dispersing agent to form a dilute aqueous solution thereof. The latex is then added to said dilute aqueous solution of dispersing agent, and thereafter, the oxidizing agent and an appropriate amount of acid to acidify the composition to the desired pH are added. By performing the aforementioned mixing techniques, the amphoteric or cationic dispersing agent can be incorporated into the coating composition without destabilizing it. However, it is noted that with respect to the use of some cationic dispersing agents, even performance of the aforementioned mixing techniques may not be effective in producing a stable coating composition which contains an effective amount of cationic dispersing agent for reducing the grainy or textured appearance of a coating to the desired degree. With respect to such cationic dispersing agents, the preferred mixing techniques may be effective in incorporating the cationic dispersing agent in the coating composition without destabilizing it, but not in amounts which are sufficient to reduce the textured and grainy appearance of the coatings to the desired degree. Such cationic dispersing agents are best used in combination with a coating composition formulated from a nonionically dispersed latex.

As the dispersing agent is used in accordance with this invention, the amount thereof will tend to be depleted, for example, by dragout, loss to the ion exchange material, etc. Thus, this ingredient should be replenished as needed. For example, additional amounts of the dispersing agent can be added to the coating composition or to the ion exchange material.

Also, in accordance with this invention, it has been found that the use of the dispersing agent may have an effect on the expected ion exchange capacity of the ion exchange material, which effect makes it advantageous to use higher amounts of the ion exchange material, amounts higher than the recommended stoichiometric excess discussed hereinabove. For example, and as mentioned above, the ion exchange capacity of resin beads sold as Amberlyst 15 is reported to be about 1.5 to about 2.0 pounds of iron per cubic foot of beads. However, the use of a surfactant having cationic properties in a coating composition of the type to which this invention relates reduces the ion exchange capacity of the ion exchange material. For example, when a composition of the A-type above, and one which contained the amphoteric surfactant of Formula I above, was used to coat iron surfaces, treatment thereof with the aforementioned ion exchange beads showed that the ion exchange capacity of the beads was about 0.7 pound of iron per cubic foot of beads.

The extent to which additional amounts of ion exchange material are used to provide the desired ion exchange capacity for a particular application in which there is used a coating composition containing a small particle size dispersing agent is best determined from experience in view of the numerous variables inherent in the process. However, for guideline purposes it is recommended that there be used an amount of ion exchange material sufficient to provide an ion exchange capacity of at least about 65 percent above the expected or reported capacity.

The coating composition for use in this invention can be prepared or replenished conveniently from an aqueous concentrate comprising:

A. about 50 g/l to about 600 g/l of resin solids dispersed in water; and
B. about 0.2 g/l to about 20 g/l, of the small particle dispersing agent, preferably an amphoteric surfactant having cationic properties in an acidic medium.

Other ingredients that can be included in the concentrate are about 5 g/l to about 40 g/l of a nonionic or anionic surfactant, and/or about 0.3 g/l to about 400 g/l of pigment. It should be appreciated that some types of pigments can be used in very small amounts to give the desired color, whereas relatively large amounts of other types of pigments will need be used to give the desired color.

To the above concentrate, which generally will have a pH of about 5 to about 11, the other ingredients comprising the composition, and additional water, can be added to give an aqueous acidic coating composition containing, for example, about 5 g/l to about 550 g/l of resin particles dispersed in the composition; about 0.4 g/l to about 5 g/l of fluoride ion; an oxidizing agent selected from the class consisting of $H_2O_2$ and dichromate, said agent being present in an amount sufficient to provide from about 0.01 to about 0.2 of oxidizing equivalent per liter of composition; hydrogen ion in an amount sufficient to impart to the composition a pH of about 1.6 to about 3.8; about 0 to about 300 g/l of pigment; and at least about 0.05 g/l and preferably at least about 0.1 g/l of said dispersing agent, preferably an amphoteric surfactant.

Smooth glossy black coatings have been very effectively applied to iron surfaces using the following type of composition:
about 40 g/l to about 200 g/l of styrene-butadiene copolymer dispersed in the composition; about 1 g/l to about 3 g/l of hydrofluoric acid; about 1 g/l to about 3 g/l of hydrogen peroxide; about 0 g/l to about 5 g/l phosphoric acid; about 0.35 g/l to about 3.5 g/l of a black pigment such as Aquablak 100, and about 0.2 g/l to about 0.4 g/l of an amphoteric surfactant such as those of Formulas I and II above; and wherein said composition has a pH of about 1.6 to about 3. Smooth glossy black coatings having a thickness of about 0.5 to about 1 mil can be applied to iron or steel articles by immersing them in the composition for about 1 to about 5 minutes. To maintain the stability of the composition as it is used to coat a multiplicity of articles, it is recommended that it be treated with an ion exchange material when the concentration of iron in the composition builds up to about 0.1 g/l to about 1 g/l. Very effective results have been attained by passing this type of composition through a column of ion exchange resin comprising beads of a nucleated polystyrene sulfonic acid. After the composition is so treated, it can be used to apply to additional iron or steel articles coatings which are smooth and glossy black in color.

ADDITIONAL EXAMPLES

Examples set forth below are illustrative of the use of this invention in forming coatings which are smooth or which have a reduced grainy or textured appearance. Comparative examples are set forth also.

In Example 3 below, and examples which follow, the coating compositions which were treated with the ion exchange material did not have metal ions therein because freshly prepared compositions were used in the coating work. Experience has shown that the composition forms textured coatings after treatment with the ion exchange material whether or not metal ions are present in the composition. The work on which the examples are based was carried out in this way to avoid the time consuming process of coating many square feet of metal; this would be required to build up the metal ion concentration in the composition, but is not necessary to illustrate the practice of the invention as it relates to the solution of the texturing problem.

EXAMPLE 3

This example illustrates the formation of textured coatings from a coating composition which has been treated with an ion exchange material. The following acidic aqueous coating composition was prepared.

| | Ingredients | Amounts, g/l |
|---|---|---|
| A) | latex comprising 56 wt. % of a copolymer of styrene-butadiene resin solids dispersed in water by a nonionic dispersing agent (Pliolite 491) | 100 |
| B) | hydrofluoric acid | 2.10 |
| C) | hydrogen peroxide | 2.26 |
| D) | carbon black pigment dispersion (Aquablak 100) | 5.00 |

To 1 liter of the above coating composition, there were added 100 grams of Amberlyst 15, a cation exchange material comprising resin beads of nucleated polystyrene sulfonic acid. The coating composition and ion exchange beads were mixed for about 10 minutes and thereafter the ion exchange beads and coating composition were separated by filtration. The coating composition was then used to coat a 3 by 4 inch steel panel by immersing the panel in the composition for about 3 minutes. After withdrawing the panel from the composition and baking at a temperature of 400°F for about 10 minutes, there was obtained a black resinous coating on the panel that was very textured in appearance. It is noted that when the composition of Example 3 is used to coat steel panels without first subjecting the composition to an ion exchange material, the resultant coatings are smooth, that is, they are not textured.

The next four examples show the separate additions to coating compositions of Example 3 above of four different surfactants prior to mixing the coating composition with the aforementioned ion exchange beads. After adding the surfactants to the coating compositions, the procedure described in Example 3 was followed. The surfactants used and the amounts thereof are set forth in Table 1 below.

TABLE 1

| Example No. | Surfactant | Amount, g/l |
|---|---|---|
| 4 | N-lauryl, myristyl beta-amino propionic acid[1] | 0.25 |
| 5 | N-coco beta-amino propionic acid[2] | 0.225 |
| 6 | N-alkyl trimethyl ammonium chloride[3] | 0.125 |
| 7 | dicoco dimethyl ammonium chloride[4] | 0.19 |

[1] Deriphat 170C
[2] Deriphat 151C
[3] Arquad 16
[4] Arquad 2C-75

The coating formed from the composition of Example 4 was completely free of texturing and those formed from the compositions of Examples 5 and 6 were somewhat textured, but the degree thereof was very significantly less than that of the coating formed from the composition of Example 3 which contained no surfactant. The coating formed from the composition of Example 7 contained more texturing than the coatings formed from the compositions of Examples 5 and 6, but was much less textured in appearance than the coating formed from the composition of Example 3. Comparison of the coating of Example 3 with those of Examples 4 to 7 showed strikingly how the use of a cationic or amphoteric surfactant can be used to avoid or reduce formation of textured coatings when such coatings are not desired. It is noted that the surfactants used in Example Nos. 4 and 5 were amphoteric surfactants and that those used in Examples 6 and 7 were cationic surfactants.

Other examples of dispersing agents within the scope of this invention that have been used effectively to reduce texturing are polyoxyethylene tallowamine (Ethomeen T/25) and octyl amine (Armeen 2D). On the other hand, the use of a nonionic or anionic surfactant has been found to be ineffective for this purpose.

Examples 8 to 14 below illustrate the effect that an amphoteric surfactant has on the thicknesses of coatings formed from coating compositions containing different amounts of the surfactant. The following acidic aqueous coating composition was prepared:

| Ingredients | Amounts, g/l |
|---|---|
| A) latex comprising 56 wt. % of a copolymer of styrene-butadiene resin solids dispersed in water by a non-ionic dispersing agent (Pliolite 491) | 100 |
| B) hydrofluoric acid | 2.1 |
| C) hydrogen peroxide | 2.4 |
| D) phorphoric acid | 5.9 |

A steel panel was immersed in the above composition for 5 minutes, withdrawn therefrom, and baked for 10 minutes at 425°F. The thickness of the coating on the panel was measured and is recorded in Table 2 below (Example No. 8). The same procedure was followed except that the above-described composition was modified by adding thereto, in the amounts indicated in Table 2 below (Examples 9 to 14), an amphoteric surfactant, namely the amphoteric surfactant represented by Formula I above (Miranol L2M-SF concentrate).

Table 2

| Example No. | Amphoteric Surfactant g/l | Coating Thickness, mil |
|---|---|---|
| 8 | 0 | 0.85 |
| 9 | 0.004 | 0.85 |
| 10 | 0.02 | 0.80 |
| 11 | 0.04 | 0.83 |
| 12 | 0.1 | 0.80 |
| 13 | 0.2 | 0.70 |
| 14 | 0.4 | 0.45 |

It can be seen from Table 2 above that the thicknesses of the coatings on the panels tended to decrease as the concentration of the amphoteric surfactant was increased. Thus, to maximize coating thickness in a particular operation, this surfactant should be used in the lower amounts. The coated panels of Examples 8 to 14 above were subjected to a salt spray test for 100 hours (ASTM B-117). It was observed that the use of the amphoteric surfactant did not affect the corrosion resistance of the coated panels adversely.

The next group of examples shows the use of the same amphoteric surfactant and coating composition used in Examples 9 to 14 above to form coatings on panels after the composition was subjected to a cation exchange resin. After the amphoteric surfactant was added to the compositions in the amounts indicated in Table 3 below, the compositions were passed through an ion exchange column charged with resin beads comprising polystyrene sulfonic acid which was cross-linked with divinylbenzene (Dowex 50W-X8). Thereafter the compositions were used to coat steel panels by immersing them in the coating compositions for 3 minutes. The appearances of the coated panels are set forth in Table 3.

Table 3

| Example No. | Amphoteric Surfactant g/l | Appearances of Coatings formed from Coating Compositions Passed Through Ion Exchange Column |
|---|---|---|
| 15 | 0.1 | textured |
| 16 | 0.2 | very slight texturing |
| 17 | 1.2 | do. |

EXAMPLE No. 18

The same procedure as described in Example No. 2 was followed. Coatings produced on the steel panels before the coating composition was passed through the ion exchange column were smooth. After the composition was passed through the ion exchange column, textured coatings were formed on the panels. To reduce the degree of texturing, there was continuously added to the bath of composition, along with the replenished ingredients and the nonionic surfactant, an amphoteric surfactant, namely the surfactant of Formula I above. The total amount of amphoteric surfactant added to the composition during the coating operation was 2.28 g. After the amphoteric surfactant was added to the composition and the composition was passed through the ion exchange column, it formed smooth coatings on the panels immersed therein.

In summary, it can be stated that the aforementioned invention provides a very practical and efficient method for maintaining the stability of a coating composition that has a tendency to destabilize during continued use. In its preferred form, the invention can be used to effectively maintain the stability of the coating composition for an indefinite period of time. Also, the invention can be used to produce on metallic surfaces smooth coatings of very attractive appearance.

We claim:

1. In the process for applying an organic coating to objects having a metallic surface by immersing said object in an acidic aqueous coating composition containing dispersed solid particles of an organic coating-forming material for a period of time sufficient to form on said metallic surface an organic coating, the thickness or amount of which increases during at least a portion of the time said surface is immersed in said composition, wherein said composition dissolves from said surface metal ions which tend to cause said composition to become unstable; and wherein said particles have a size within the range of about 0.01 to about 0.1 micron and larger; and wherein said composition is contacted with an ion exchange material which removes said metal ions from said coating composition thereby maintaining said composition stable; and wherein said coating composition prior to being contacted with said ion exchange material forms on said surface a smooth or glossy coating; and wherein said composition after being treated with said ion exchange material tends to form on said surface a coating which is grainy or textured in appearance; the improvement comprising contacting said composition with said ion exchange material in the presence of a dispersing agent which is effective in maintaining dispersed in said composition said particles having a size within the range of about 0.01 to about 0.1 micron, and thereafter coating said metallic surface with the thus treated composition containing said particles having a size within the range of about 0.01 to about 0.1 micron thereby forming on said metallic surface a smooth coating or a coating which has a reduced grainy or textured appearance.

2. A process according to claim 1 wherein said particles are resin particles.

3. A process according to claim 2 wherein said dispersing agent is a protective colloid.

4. A process according to claim 2 wherein said coating composition includes a black pigment.

5. A process according to claim 2 wherein said dispersing agent is a surfactant having cationic properties in said acidic aqueous composition.

6. A process according to claim 5 wherein said surfactant is an amphoteric surfactant.

7. A process according to claim 6 wherein the amount of said amphoteric surfactant in said composition is at least about 0.05 g/l.

8. A process according to claim 7 wherein the amount of said amphoteric surfactant in said composition is about 0.1 to about 0.5 g/l.

9. A process according to claim 5 wherein said composition is contacted with an amount of ion exchange material that is at least about 65 percent above the amount theoretically needed to remove a predetermined amount of said metal ions.

10. A process according to claim 9 wherein said metal ions are iron ions and wherein said surfactant is an amphoteric surfactant.

11. A process according to claim 10 wherein said ion exchange material is a nucleated polystyrene sulfonic acid.

12. A process for applying a coating to objects having a metallic surface comprising:
   A. immersing said object in an acidic aqueous coating composition which comprises:
      a. about 5 g/l to about 550 g/l of resin dispersed in the composition, the source of the resin being a latex thereof;
      b. about 0.4 g/l to about 5 g/l of fluoride ion;
      c. an oxidizing agent selected from the class consisting of $H_2O_2$ and dichromate, said agent being present in an amount sufficient to provide from about 0.01 to about 0.2 of oxidizing equivalent per liter of composition; and
      d. hydrogen ion in an amount sufficient to impart a pH to the composition of about 1.6 to about 3.8 wherein said composition dissolves from said surface metal ions which tend to cause said composition to become unstable;
   B. contacting said composition with an ion exchange material which removes metal ions from said coating compositions thereby maintaining said composition stable, wherein said composition after being contacted with said ion exchange material tends to form on said metallic surface a coating which is grainy or textured in appearance; and
   C. contacting said composition with said ion exchange material in the presence of an amphoteric or cationic surfactant in an amount sufficient to form on said surface a smooth coating or a coating which has a reduced grainy or textured appearance.

13. A process according to claim 12 wherein said metallic surface is a ferriferous surface, wherein said metal ions are iron ions and wherein the concentration of of iron ions in the composition is maintained below about 3 g/l.

14. A process according to claim 13 wherein iron ions are removed from the composition to keep the concentration thereof from exceeding about 1.5 g/l.

15. A process according to claim 12 wherein the amount of said surfactant is at least about 0.05 g/l.

16. A process according to claim 15 wherein the amount of said surfactant is about 0.1 to about 0.5 g/l.

17. A process according to claim 16 wherein said surfactant is an atmospheric surfactant.

18. A process according to claim 15 wherein said surfactant is an amphoteric surfactant.

19. A process according to claim 18 wherein said coating composition includes a black pigment.

20. A process according to claim 12 wherein said composition comprises:
   a. styrene-butadiene copolymer resin solids;
   b. about 1 to about 5 g/l of hydrofluoric acid; and
   c. about 1.5 to about 6 g/l of hydrogen peroxide and wherein the pH of said composition is about 1.6 to about 3.0, wherein said metallic surface is a ferriferous surface, wherein said metal ions are iron ions and wherein iron ions are removed from the composition to keep the concentration thereof from exceeding about 1.5 g/l.

21. A process according to claim 20 wherein the amount of said surfactant is at least about 0.05 g/l.

22. A process according to claim 21 wherein the amount of said surfactant is about 0.1 to about 0.5 g/l.

23. A process according to claim 22 wherein said surfactant is an amphoteric surfactant.

24. A process according to claim 21 wherein said surfactant is an amphoteric surfactant.

25. A process according to claim 24 wherein said coating composition includes a black pigment.

26. A process according to claim 12 wherein said composition is contacted with an amount of ion exchange material that is at least about 65 percent above the amount theoretically needed to remove a predetermined amount of said metal ions.

27. A process according to claim 26 wherein said metal ions are iron ions and wherein said surfactant is an amphoteric surfactant.

28. A process according to claim 27 wherein said ion exchange material is a nucleated polystyrene sulfonic acid.

29. A process according to claim 20 wherein said composition is contacted with an amount of ion exchange material that is at least about 65 percent above the amount theoretically needed to remove a predetermined amount of said metal ions.

30. A process according to claim 29 wherein said surfactant is an amphoteric surfactant.

31. A process according to claim 30 wherein said ion exchange material is a nucleated polystyrene sulfonic acid.

32. A process for applying an organic coating to objects having a metallic surface comprising:
   A. immersing said object in an acidic aqueous coating composition containing dispersed solid particles of an organic coating-forming material for a period of time sufficient to form on said metallic surface an organic coating, the thickness or amount of which increases during at least a portion of the time said surface is immersed in said composition, wherein said composition dissolves from said surface metal ions which tend to cause said composition to become unstable;
   B. contacting said composition with an ion exchange material which removes metal ions from said coating composition thereby maintaining said composition stable, wherein said coating composition, after being treated with said ion exchange material, tends to form coatings which are grainy or textured in appearance; and including
   C. contacting said composition with said ion exchange material in the presence of an amphoteric or cationic surfactant, wherein the amount of said surfactant is an amount sufficient to form on said surface a smooth coating or a coating which has a reduced grainy or textured appearance.

33. A process according to claim 32 wherein said particles are resin particles.

34. A process according to claim 33 including regenerating said ion exchange material by contacting it with a regenerating material that contains a sequestering agent which sequesters metal ions which are displaced from said ion exchange material.

35. A process according to claim 34 wherein said particles are resin particles, wherein said metal ions are iron ions and wherein said sequestering agent is oxalic acid, citric acid or glycolic acid.

36. A process according to claim 35 wherein said sequestering agent is oxalic acid.

37. A process according to claim 33 wherein said surfactant is included in said composition in an amount of at least about 0.05 g/l.

38. A process according to claim 33 wherein the amount of said surfactant is at least about 0.1 g/l.

39. A process according to claim 38 wherein the amount of said surfactant is about 0.2 to about 0.5 g/l.

40. A process according to claim 38 wherein said metal ions are iron ions.

41. A process according to claim 40 wherein said surfactant is an amphoteric surfactant.

42. A process according to claim 41 wherein said surfactant is either

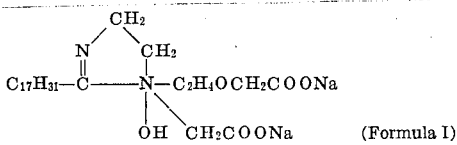

(Formula I)

or

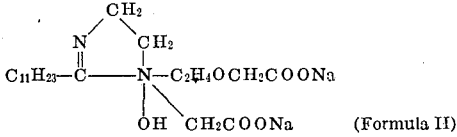

(Formula II)

43. A process according to claim 40 wherein said composition is contacted with an amount of ion exchange material that is at least about 65 percent above the amount theoretically needed to remove a predetermined amount of said iron ions.

44. A process according to claim 33 including regenerating said ion exchange material by contacting it with a regenerating acidic material that is an ingredient of said composition.

45. A process according to claim 44 wherein said particles are resin particles, wherein said metal ions are iron ions, wherein said composition contains phosphoric acid and wherein said ion exchange material is regenerated by contacting it with phosphoric acid.

* * * * *

UNITED STATES PATENT OFFICE
CERTIFICATE OF CORRECTION

Patent No. 3,839,097         Dated October 1, 1974

Inventor(s) Wilbur S. Hall and Harry M. Leister

It is certified that error appears in the above-identified patent and that said Letters Patent are hereby corrected as shown below:

IN THE SPECIFICATION

Column 13, line 21, "occuring" should read --occurring--.

Column 17, line 45, "mamterial" should read --material--.

Column 18, lines 20 and 21, "centi-menter" should read --centimeter--.

Column 18, line 51, "varius" should read --various--.

Column 25, line 1, "utilizinng" should read --utilizing--.

IN THE CLAIMS

Claim 12, line 21, "compositions" should read --composition--.

Claim 13, line 3, delete "of", second occurrence.

Claim 17, line 2, "atmospheric" should read --amphoteric--.

Signed and sealed this 7th day of January 1975.

(SEAL)
Attest:

McCOY M. GIBSON JR.
Attesting Officer

C. MARSHALL DANN
Commissioner of Patents